(12) United States Patent
Oudin et al.

(10) Patent No.: US 9,915,157 B2
(45) Date of Patent: Mar. 13, 2018

(54) AIRCRAFT ENGINE AIR FLOW STRAIGHTENING VANE AND ASSOCIATED FLOW STRAIGHTENING STRUCTURE

(71) Applicant: AIRCELLE, Gonfreville L'Orcher (FR)

(72) Inventors: Arnaud Oudin, Vitry S/Seine (FR); Bertrand Desjoyeaux, Sainte Adresse (FR); Nicolas Dezeustre, Le Havre (FR); Olivier Kerbler, Antony (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 547 days.

(21) Appl. No.: 14/286,666

(22) Filed: May 23, 2014

(65) Prior Publication Data

US 2014/0255178 A1   Sep. 11, 2014

Related U.S. Application Data

(63) Continuation of application No. PCT/FR2012/052615, filed on Nov. 13, 2012.

(30) Foreign Application Priority Data

Nov. 24, 2011 (FR) ...................................... 11 03588

(51) Int. Cl.
*F01D 9/02* (2006.01)
*F01D 25/28* (2006.01)
*F04D 29/02* (2006.01)
*F04D 29/54* (2006.01)

(52) U.S. Cl.
CPC ............... *F01D 9/02* (2013.01); *F01D 25/28* (2013.01); *F04D 29/023* (2013.01); *F04D 29/542* (2013.01); *F05C 2225/08* (2013.01); *F05D 2240/12* (2013.01); *F05D 2300/43* (2013.01); *F05D 2300/436* (2013.01);
(Continued)

(58) Field of Classification Search
CPC ........ F01D 9/02; F01D 29/542; F01D 29/023; F01D 25/28; B29C 39/10; B29C 61/0658; B29C 65/344; B29C 65/5028; B29C 70/22
See application file for complete search history.

(56) References Cited

U.S. PATENT DOCUMENTS 4,725,485 A * 2/1988 Hirokawa ............ D03D 25/005
139/DIG. 1
6,196,794 B1   3/2001 Matsumoto
(Continued)

FOREIGN PATENT DOCUMENTS

EP   1 215 365 A1   6/2002
EP   1 669 547 A2   6/2006
(Continued)

OTHER PUBLICATIONS

International Search Report dated Mar. 13, 2013 in International Application No. PCT/FR2012/052615.

*Primary Examiner* — Woody Lee, Jr.
*Assistant Examiner* — Maxime Adjagbe
(74) *Attorney, Agent, or Firm* — Burris Law, PLLC (57) ABSTRACT

A flow straightening vane made of composite materials includes a core made up of three-dimensional woven textile rods which core is surrounded by a textile covering, this core and this covering being consolidated using a thermoset resin.

13 Claims, 6 Drawing Sheets

(52) U.S. Cl.
CPC .... *F05D 2300/44* (2013.01); *F05D 2300/603* (2013.01); *F05D 2300/6034* (2013.01); *Y02T 50/672* (2013.01)

(56) References Cited

U.S. PATENT DOCUMENTS

| | | | |
|---|---|---|---|
| 7,114,917 B2 * | 10/2006 | Legg | F01D 9/04 415/137 |
| 2008/0072569 A1 * | 3/2008 | Moniz | F01D 5/147 60/226.1 |
| 2009/0246446 A1 * | 10/2009 | Backhouse | F01D 5/147 428/76 |
| 2011/0038732 A1 | 2/2011 | Huth et al. | |
| 2011/0182743 A1 * | 7/2011 | Naik | B29B 11/16 416/230 |
| 2011/0229326 A1 * | 9/2011 | Papin | F01D 9/041 416/179 |

FOREIGN PATENT DOCUMENTS

| | | |
|---|---|---|
| EP | 1 908 920 A2 | 4/2008 |
| EP | 2 105 579 A2 | 9/2009 |
| FR | 2 625 528 A1 | 7/1989 |

\* cited by examiner

AIRCRAFT ENGINE AIR FLOW STRAIGHTENING VANE AND ASSOCIATED FLOW STRAIGHTENING STRUCTURE

CROSS-REFERENCE TO RELATED APPLICATIONS

This application is a continuation of International Application No. PCT/FR2012/052615, filed on Nov. 13, 2012, which claims the benefit of FR 11/03588, filed on Nov. 24, 2011. The disclosures of the above applications are incorporated herein by reference.

FIELD

The present disclosure generally relates to the field of dual-flow turbomachine for aircraft and more particularly to the secondary flow straightening vanes, and to an associated flow straightening structure.

BACKGROUND

The statements in this section merely provide background information related to the present disclosure and may not constitute prior art.

Figure 1:
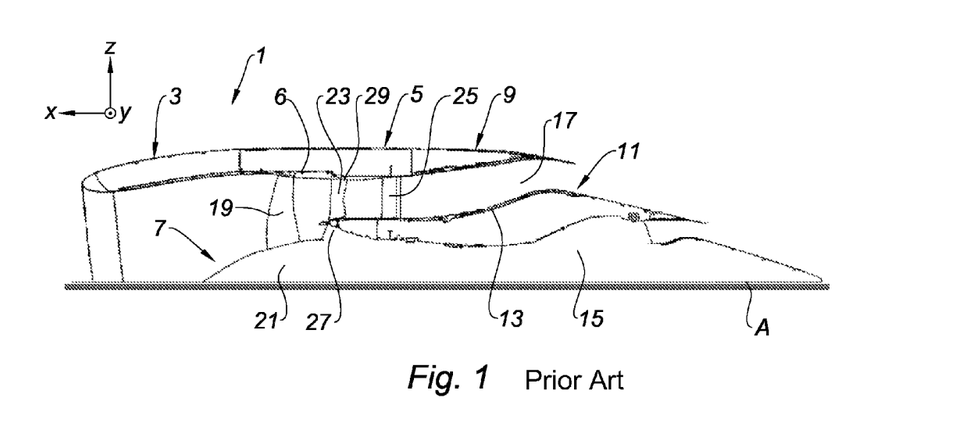
FIG. 1 is a longitudinal half-sectional view of a nacelle and engine set of the prior art, commented in the preamble of the present description.

As shown in FIG. 1, a propulsion unit of a dual-flow turbojet engine comprises typically an outer structure 1 including an upstream part 3 forming an air inlet, an intermediate part 5, the inner skin 6 of which forms a casing for the blower 7 of the engine, and a downstream part 9 which can incorporate reversing thrust means.

This nacelle further includes an inner structure 11 having a fairing 13 of the engine 15.

The volume delimited in particular by the inner skin 6 of the outer structure 1 and by the fairing 13 of the inner structure 11, defines an annular air vein 17, often referred to as "cold air vein", as opposed to the hot air generated by the engine 15.

The blower 7 consists of a propeller provided with blades 19, rotationally mounted on a rotating shaft connected to and centered on a bearing 21, the bearing 21 is connected to the blower casing 6 by a set of transverse structure 25 identified in FIG. 1, radially extending in the cold air vein 17, such as structural arms able to be distributed to 90 or 120 degrees, for example.

In this same cold air vein 17 is located a flow straightening structure comprising flow straightening vanes 23, also called OGV "Outlet Guide Vanes", allowing to straighten backward the cold air flow generated by the blower 7.

Concepts in which the wheel of the vanes OGV replaces the structural arms, providing thus the two functions of flow straightening and of connecting the bearing 21 to the blower casing 6 are also known.

Wheels OGV called structural in which the OGVs are metallic are thus known.

Nonstructural composite wheels OGV associated with the metallic structural arms are also known.

The design of composite and structural OGVs, allowing thus to totally or partially overcome structural arms, presents a significant challenge to design and produce the fasteners of these vanes at their ends and the structure continuity of these fasteners with the body of the vanes.

SUMMARY

The present disclosure provides vanes made of composite materials for structural flow straightening structure, which have an increased resistance/weight ratio.

The present disclosure also provides a flow straightening vane made of composite materials, comprising a core made up of three-dimensional woven textile rods, surrounded by a textile covering, this core and this covering being consolidated using a thermoset resin.

Thanks to these features, a flow straightening vane in which the three-dimensional woven fiber core provides a high resistance, and the textile covering provides the desired shape as well as a resistance to the eventual impacts, all at a very advantageous weight.

Following other features of the flow straightening vane according to the present disclosure:

Said textile rods have ends connecting the vane to the wheels of a flow straightening structure;

Said ends have a shape within the group comprising the T-shapes, L-shapes, dovetail-shapes, parallel to the vane plane, transverse to the vane plane, inclined relative to the vane plane, folded or twisted;

Said core and said covering are made up of fibers selected in the group comprising carbon fibers, glass fibers and aramid fibers;

Said resin is a resin compatible with an injection method selected in the group of thermosetting resins such as the epoxy resins and the polyimide resins or in the group of thermoplastic resins such as PEEK, PPS;

Said textile is selected in the group comprising two-dimensional woven, stitched or braided textiles, and the three-dimensional textiles;

The core and the covering are interconnected by transverse fibers or transverse threads;

Said vane includes reinforcement elements selected in the group comprising counter plates, inserts, a rigid element forming a leading edge and anti-erosion coating;

Said vane comprises one or more hollow areas;

Said vane comprises one or more lightened nuclei;

Said core has a shape selected in the group comprising the parallel bars-shapes, H-shapes, H-shapes with several bars, O-shapes, W-shapes, M-shapes, X-shapes with parallel bars, X-shapes, K-shapes, inverted K-shapes, N-shapes, inverted N-shapes.

The present disclosure also relates to a flow straightening structure, comprising a wheel of smaller diameter, a blower bearing mounted inside this wheel, a wheel of larger diameter, and a plurality of vanes in conformity with the foregoing, cooperating by their terminations with these two wheels.

Following features of this flow straightening structure:

The coverings of said vanes are joined;

Said vanes intercalate between the positions of connecting structural arms between said bearing and said wheel of larger diameter.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Note also that we took care of representing on these figures a landmark with three axes X, Y, Z, these three axes being respectively representative of the longitudinal, transverse and vertical directions of the engine when it is installed on an aircraft.

For the sake of simplification in what follows, it will be assumed that the mean plane of each vane is substantially parallel to the XZ plane, which is obviously not the case in reality precisely because these vanes must have a certain angle of incidence to allow the flow straightening.

We are now referring to FIGS. 2 to 5 and 7, on which a flow straightening vane in conformity with a first form according to the present disclosure is shown.

As can be seen in these figures, this vane 23 includes a core 36 made up of two "textile rods" 37a and 37b, which are themselves obtained with fibers of glass or carbon or aramid woven in three dimensions.

According to a first variant, such "textile rods" can be obtained by three-dimensional weaving.

For example, such "textile rods" can be obtained from the BITEAM Company (www.biteam.com), specialized in this kind of products.

The three-dimensional weaving may be obtained through a chain and one or two wefts respectively disposed in two or three substantially perpendicular directions of the space (either the same weft thread is carried between the chains to cover the interlaces in all the directions of the plane transverse to the chains, or separate weft threads make the interlaces, in the plane transverse to the chains, according to two main directions substantially perpendicular to each other).

According to a second variant, such "textile rods" can be obtained using matrix braiding machine.

The two rods 37a and 37b are surrounded by a textile covering 39, that may be made up from at least one layer of two-dimensional woven, braided or stitched textile fibers, or of three-dimensional textile.

The two-dimensional woven textiles are obtained by weaving chain fibers and weft fibers substantially perpendicular to each other in the mean plane of the fold. These textiles are commonly called fabrics, cloth, taffeta, twill or satin by those skilled in the art according to the selected weaving pattern.

The two-dimensional woven textiles are obtained by weaving fibers, crossed according to two directions by method called of braiding and eventually of fibers according to a third longitudinal direction of the braiding direction, all the fibers being substantially in the mean plane of the fold.

The two-dimensional stitched textiles are obtained by superposing two or more fiber layers in different directions, the layers being bonded by stitches more or less spaced.

The three-dimensional textiles are made up of a superposition of fiber layers bonded together by transverse fibers interlacing of some of the fibers between the layers. These textiles are commonly called 3D fabrics or 3D interlock fabrics, or layer-to-layer interlock fabrics by those skilled in the art.

The fibers forming the above-mentioned textile may be fibers of carbon, of glass, or aramid, for example.

The covering 39 is constituted of a stack of at least one of the above-mentioned textiles. When several layers are stacked, the orientation of each of them may be selected different from the others.

The stacks of folds forming the covering may also be joined together by additional transverse threads in thickness such as by a method called of stitching appearing in particular in the family of stitches of pillar stitch types or tufting or needling well-known.

We can also integrate to the molding or report subsequently to the flow straightening vane additional elements, such as inserts, plates, counterplates, elements forming leading edge, all of these elements may be for example in a metal or ceramic alloy.

Placing an anti-erosion coating on the leading edge of the flow straightening vane 23, can further be considered.

As can be seen in the various drawings, the recourse to the three-dimensional core weaving or braiding principle allows to change the geometries of textile rods including core terminations, to obtain different end shapes for an easy assembly.

This feature of three-dimensional weaving or braiding provides multiple possibilities of shapes, with the advantage of offering a continuity of fibers from one part to the other, including fiber chains substantially parallel to the greatest length of the rods.

Figure 2:
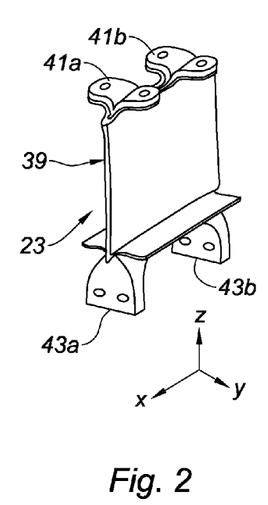
FIGS. 2, 3, 4, 5 are respectively perspective side views, in section according to the line V-V and in section according to the line VI-VI of one form of a flow straightening vane according to the present disclosure.
Figure 3:
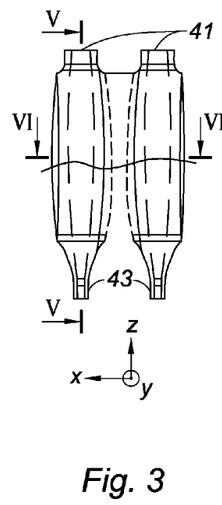
Figure 4:
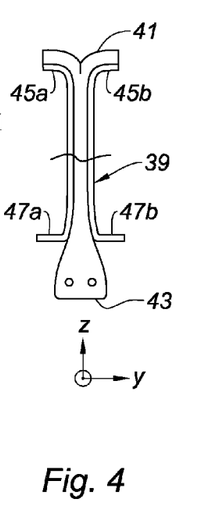

In a first configuration shown in FIGS. 2, 3 and 4, the rods 37a and 37b of the core 36 can be shaped so that they have at their respective ends, T-shapes 41a, 41b, or clevis-shapes 43a, 43b, respectively oriented in a tangential and radial manner relative to the axis A of the turbojet engine, that is to say in this case, according to two different directions XY and YZ but both transverse to the plane XZ, and fitted with orifices allowing the connection of these terminations respectively to large and small wheels 29, 27 of the flow straightening set.

Figure 5:
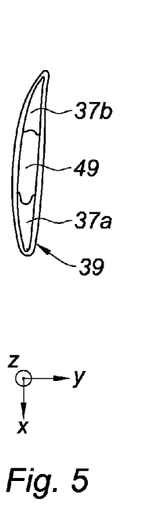
Figure 5A:
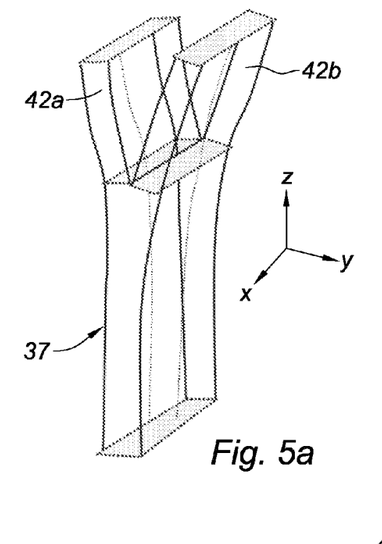
FIGS. 5a and 5b illustrate how to make a core with a T-end.
Figure 5B:
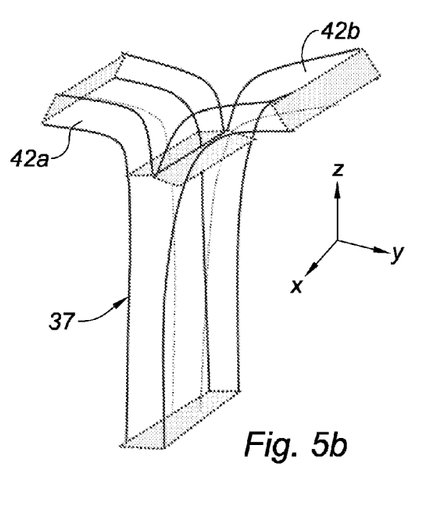

More precisely, and as can be seen in FIGS. 5a and 5b, this T-shape of the ends of the textile rods 37 can be obtained by making a three-dimensional weaving with an area untied to two branches 42a, 42b, forming a sort of Y (FIG. 5a), which is then put aside by a forming operation (FIG. 5b) to obtain the T-shaped ends 41a, 41b.

The three-dimensional weaving and braiding techniques allow, in the same manner, to change the distribution of chain fibers of the textile rod while maintaining the orientation thereof substantially parallel to the direction of the greatest length of the rod.

Figure 5C:
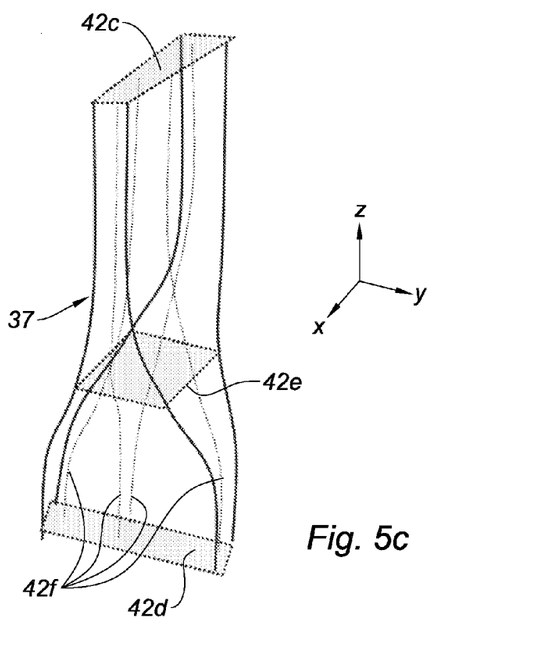
FIG. 5c illustrates how to make a clevis-ended core with pivoted of about 90° relative to the plane of the vane.

This is illustrated in FIG. 5c, on which a textile rod can be seen comprising two rectangular sections 42c, 42d, and pivoted of about 90 degrees relative to each other: such a configuration may for example correspond to the ends 43a, 43b of the vane rods shown in FIGS. 2 to 5.

The transition from the section 42c to the section 42d is made by a substantially square intermediate area 42e, the distribution of the chain fibers 42f being organized so that to allow this transition.

It can be seen also in FIGS. 2 and 4 that the covering 39 may include rolled up tangential parts 45a, 45b and 47b, which can extend over a sufficiently large circumferential length to be contiguous from a vane to the other.

These coverings can participate in the consolidation of large 29 and small 27 wheels and/or in the making up of the aerodynamic shape of the inner and/or outer ferrule.

Also note in FIG. 5 that the flow straightening vane may include, between the rods 37a and 37b, an area 49 which may be either hollow or filled with a lightened material such as the rigid closed-cell foam, such as low density foams and of material compatible with the resin of consolidation and of the temperatures of implementation.

For example, foams of density between 40 kg/m3 and preferably inferior to 250 kg/m3 of polyurethanes, polyvinyl chloride or of polymethacrylic imide, etc. can be used.

The presence of a such lightened foam allows to avoid the filling of the cavity 49 with resin during the manufacturing of flow straightening vane, thus leading to a strong weight economy: such foam is indeed 4 to 20 times lighter than the resin.

The vane 23 constituted of the set of the core 36, of the covering 39, of the eventual lightened nuclei, is consolidated by resin impregnation and its hardening, giving the vane all its rigidity, resistance and shape.

The different elements prepared are placed inside a mold wherein the resin is injected. An RTM injection method can be used in a rigid closed mold to obtain the totality of the surfaces with precise dimensions. A method of vacuum infusion type may also be used, with a flexible tooling part, or else any alternative environment of infusion molding.

In one form, a hollow area in the vane can be made, either by introduction of a tooling element by one end, and extraction during the de-molding, or by insertion of a nucleus between the two faces of the covering, and elimination of the nucleus after de-molding by its melting or dissolution.

Resin is selected according to the operating temperature of the vane, in the families of thermosetting epoxy resins, polyimides, polyester, vinyl ester, cyanate ester or derivatives of these families, or else in the families of thermoplastic resins such as PPS PEEK PEKK, PEI.

Finally, to allow the connection of the vanes with inner 27 and outer 29 wheels, with tight geometric tolerances, it is possible to proceed to the machining of all or part of the end areas in order for example to crop the contour of the clevises, to surface the flanks of clevises and to cut out the passages of bindings.

As it can be understood in light of the foregoing, the flow straightening vane according to the present disclosure includes a structural part strictly speaking formed by the core 36, which is extremely resistant due to its 3D weaving features with carbon, glass or aramid fibers, and very light-weight.

The flow straightening vane according to the present disclosure also includes a part defining its aerodynamic profile, obtained by a two-dimensional or three-dimensional textile covering.

The cooperation of this core 36 and of this covering 39, secured together by the resin, provides a flow straightening vane at the same time very light and very resistant, which is perfectly suitable for use in the cold air flow vein 17 in order to connect the engine to the suspension pylon of the nacelle.

Figures 6A, 6B, 6C:
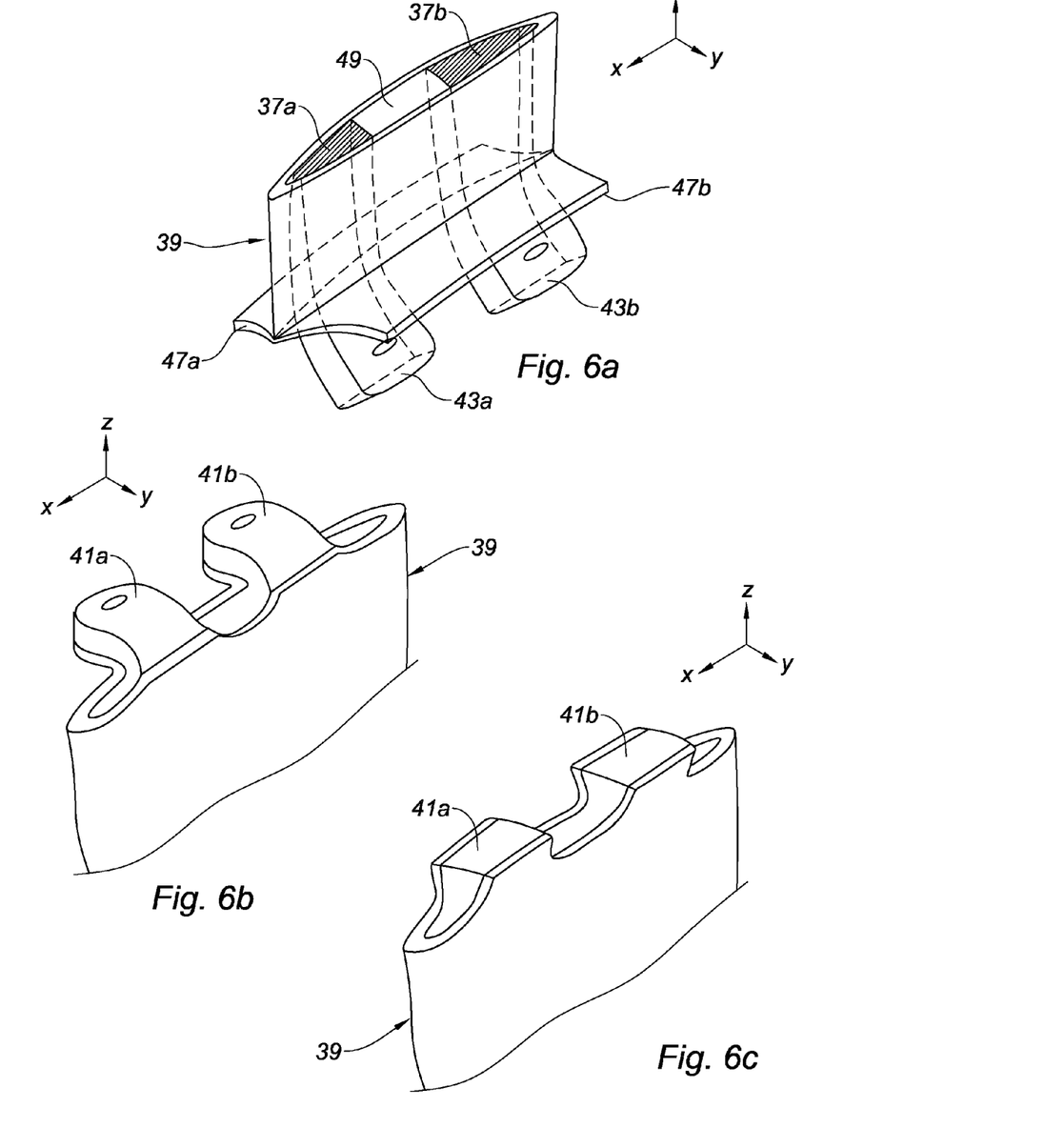
FIGS. 6a, 6b, 6c are partial perspective views of other forms of a flow straightening vane according to the present disclosure.

FIGS. 6a, 6b, 6c show some possible variants for the terminations of the straightening vanes.

In FIG. 6a, substantially radial clevises 43a, 43b can be seen, having an inclination of several degrees relative to a plane passing through the axis A of the nacelle, and relative to the plane XZ.

In FIG. 6b, L-shaped terminations 41a, 41b can be seen, both extending from the same side relative to the vane, in a substantially tangential direction, that is to say in a direction substantially parallel to the XY plane.

In FIG. 6c, extended terminations 41a, 41b having a substantially dovetail shape can be seen.

These variations are of course not limiting, and may be combined together.

Figure 6D:
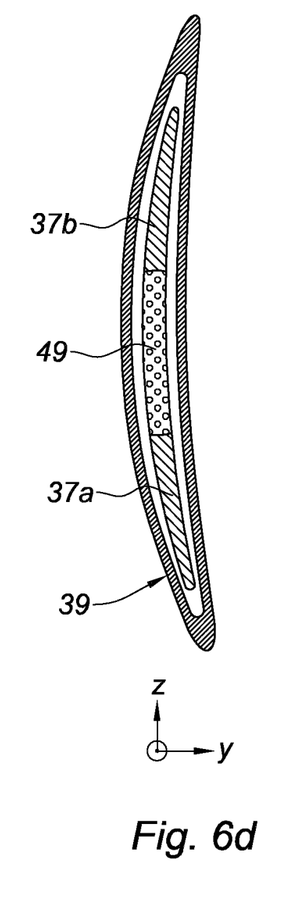
FIGS. 6d, 6e, 6f are sectional views similar to the view of FIG. 5 of different possible structures of flow straightening vanes according to the present disclosure, and in particular of different ends of textile rods allowing the connection of these vanes with the wheels of a flow straightening structure.
Figure 6E:
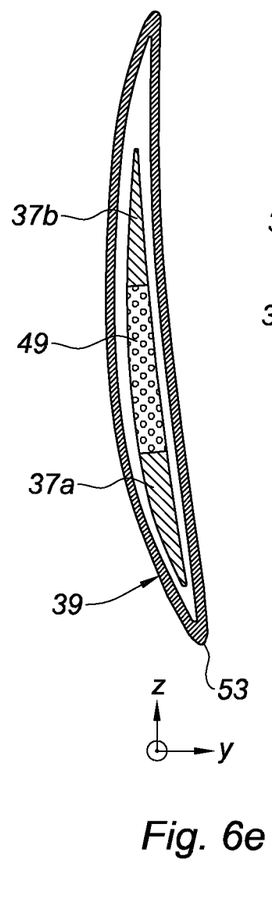
Figure 6F:
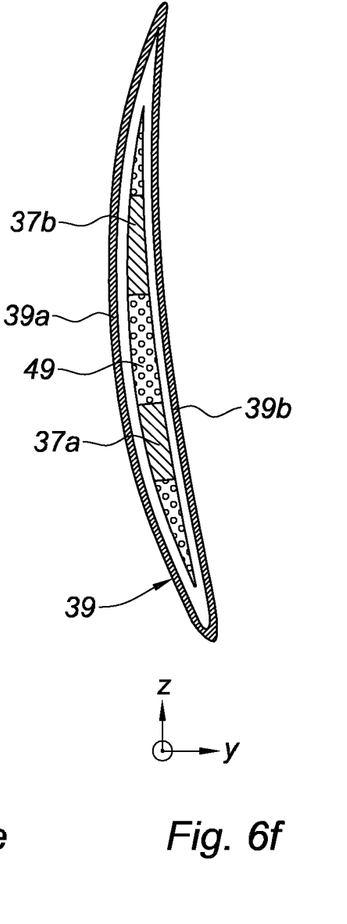
Figure 7:
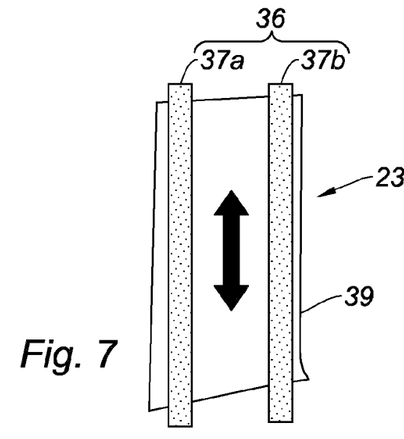
FIG. 7 is a schematic side view of the vane of FIGS. 2 to 5, showing the preferred directions of picking up loads.

FIGS. 6d, 6e, 6f show alternative structures for the straightening vanes.

In FIG. 6d the covering 39 is composed of tubular braids which encapsulate the textiles rods 37a, 37b and a foam nucleus 51.

In FIG. 6e, the covering 39 is made from an open textile, folded around the vane, for example at the leading edge 53.

In FIG. 6f, the covering 39 composed of two subsets 39a, 39b each constituting one of the two faces of the vane.

According to a variant of the association of the rods 36 and of the covering 39, the covering can be connected to at least one of the rods, by additional links, through the thickness.

Thus, according to a first variant, carbon or aramid or glass fibers, are transversely inserted through the covering 39 and penetrate in at least a part of the rods 36 for example with a tufting, or a needling method, or by completely traversing the rods with the same method or a method of stitching.

In a second variant, rigid thin elements are transversely inserted on the plane of the covering 39, these rigid thin elements that can be pultruded composite needles of glass, aramid or carbon fiber, these rigid elements can still be metallic threads in the form of fine nails or of staples. These rigid members may be inserted according to a method of nailing or of Z-pinning or equivalent.

On all FIGS. 8 to 18, different possible variants of the core 36 are shown, the arrows on these figures indicating the preferred directions of the loads taken by the rods forming the core.

More precisely, the straight arrows indicate force transmissions of and the curved arrows indicate transmissions of moments.

Figure 8:
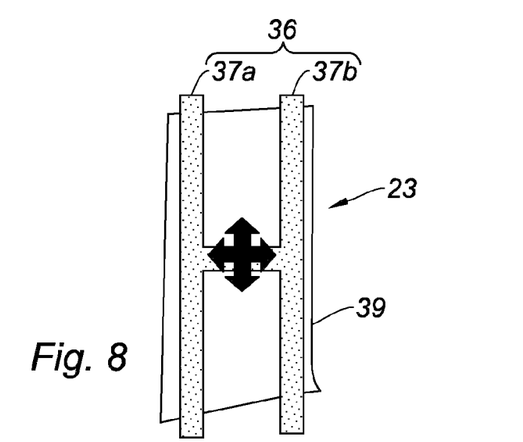
FIGS. 8 to 18 are views similar to those of FIG. 7 of other forms of a flow straightening vane according to the present disclosure.
Figure 9:
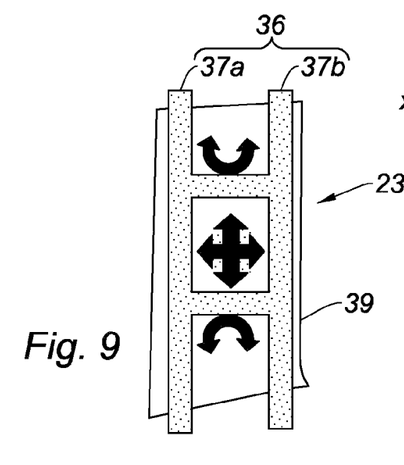
Figure 10:
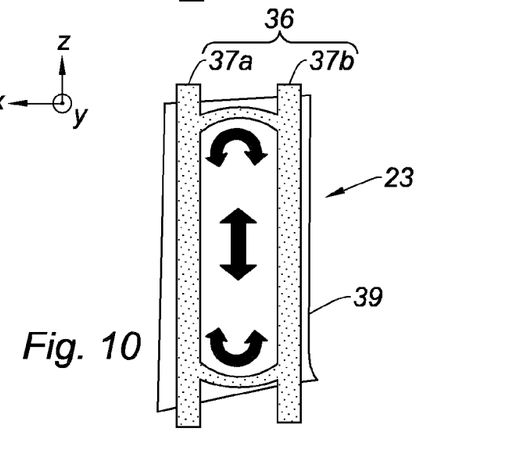
Figure 11:
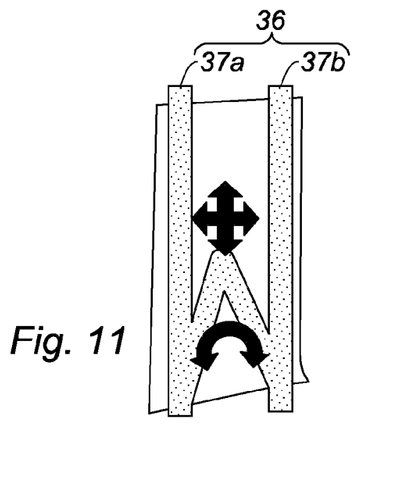
Figure 12:
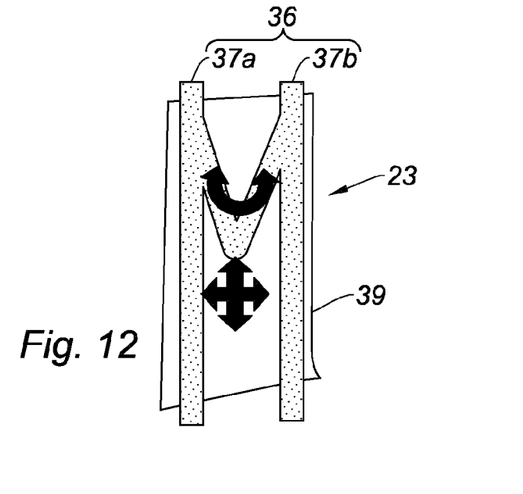
Figure 13:
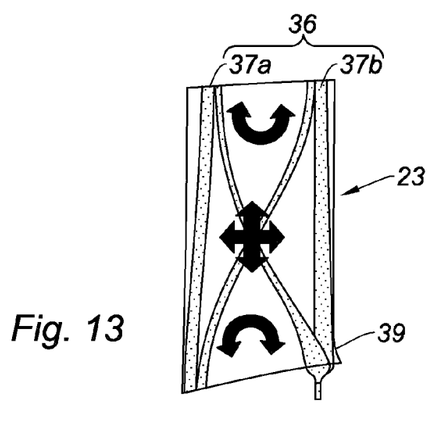
Figure 14:
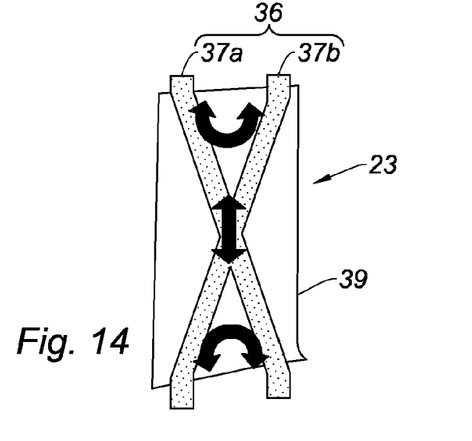
Figure 15:
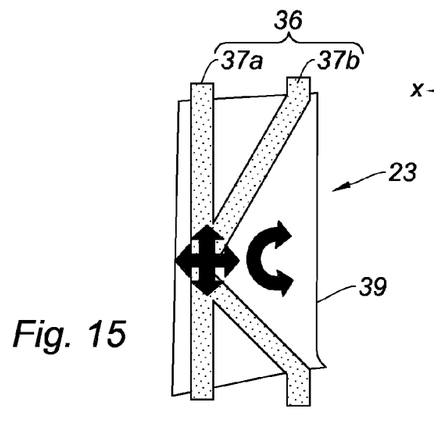
Figure 16:
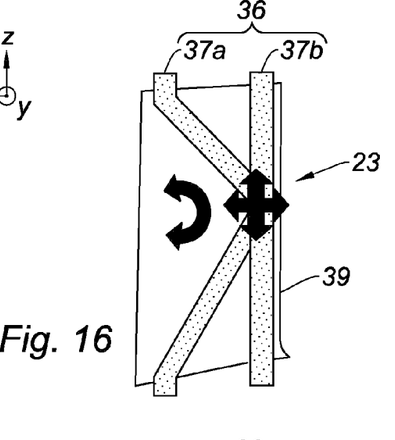
Figure 17:
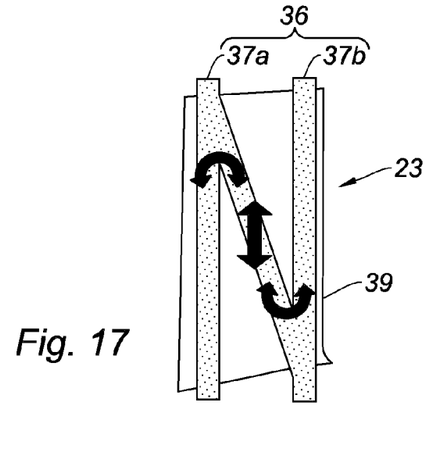
Figure 18:
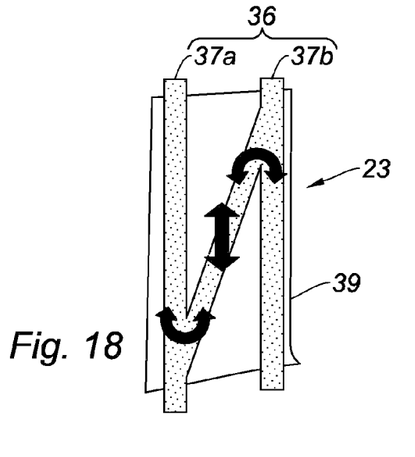

Thus, it can be seen:

FIG. 8: an H-shaped core structure, allowing to resist to axial (X direction) and radial (Z) forces, providing the vane a particular impact resistance of objects likely to circulate in the cold air vein, FIG. 9: an H-shaped structure with several rods, allowing further to resist to tangential moments (moments around the Y axis), FIG. 10: an O-shaped structure, allowing to resist to radial (Z) and axial (X) forces, as well as a tangential moment (around the Y axis), FIG. 11: a W-shaped structure, allowing to resist to the radial and axial forces, as well as to a tangential moment in the side of a small wheel 27, FIG. 12: an M-shaped structure, allowing to resist to the radial and axial forces, as well as to a tangential moment in the side of large wheel 29, FIG. 13: an X-shaped structure with parallel rods, allowing to resist to the radial and axial forces, as well as to a tangential moment in the side of large wheel 27 and small wheel 29, FIG. 14: an X-shaped structure, allowing to resist to the radial forces and to a tangential moment 27 in the side of small wheel 27 and large wheel 29, FIGS. 15 and 16: a K-shaped and an inverted K-shaped structure respectively, allowing to resist to the radial and axial forces, as well as a tangential moment, FIG. 17: an M-shaped structure, allowing to resist to radial forces and to a tangential moment in a downstream side of the small wheel 27 and in an upstream side of the large wheel 29, and FIG. 18: an N-shaped inverted structure, allowing to resist to radial forces and to a tangential moment in an upstream side of the small wheel 27 and in a downstream side of the large wheel 29.

Of course, the present disclosure is in no way limited to the forms described and shown, provided by way of simple examples.

What is claimed is:

1. A flow straightening vane made of composite materials comprising a core made up of textile rods woven in three dimensions and an area defined between the textile rods, the area being hollow or filled with a lightened material, the textile rods being surrounded by a textile covering connected to the textile rods and defining an aerodynamic profile of the flow straightening vane, said core and said textile covering being consolidated using a thermoset resin, wherein the textile rods are oriented along a vertical direction of an aircraft engine and are configured to transfer structural loads between inner and outer wheels of the aircraft engine, the textile rods having longitudinal ends extending beyond the textile covering to form termination ends for connecting to the inner and outer wheels of the aircraft engine, the termination ends being integral parts of the textile rods.

2. The flow straightening vane according to claim 1, wherein said termination ends have a shape selected from a group consisting of T-shapes, L-shapes and dovetail-shapes, parallel to a vane plane, transverse to the vane plane, inclined relative to the vane plane, folded or twisted.

3. The flow straightening vane according to claim 1, wherein said core and said textile covering are formed of fibers selected from a group consisting of carbon fibers, glass fibers and aramid fibers.

4. The flow straightening vane according to claim 1, wherein said thermoset resin is a resin compatible with an injection method, said resin selected from a group consisting of epoxy resins and the polyimide resins.

5. The flow straightening vane according to claim 1, wherein said textile is selected from a group consisting of two-dimensional, woven or stitched textiles, and three-dimensional textiles.

6. The flow straightening vane according to claim 1, wherein said core and said textile covering are interconnected by transverse fibers or transverse threads.

7. The flow straightening vane according to claim 1, wherein said core has a selected shape from a group consisting of parallel bars-shapes, H-shapes, H-shapes with several bars, O-shapes, W-shapes, M-shapes, X-shapes with parallel bars, X-shapes, K-shapes, inverted K-shapes, N-shapes, and inverted N-shapes.

8. The flow straightening vane according to claim 1, wherein said thermoset resin is a thermoplastic resin compatible with an injection method, said thermoplastic resin selected from a group consisting of polyetheretherketone and polyphenylene sulfide.

9. The flow straightening vane according to claim 1, wherein said lightened material is a material made of a rigid closed-cell foam or a low density foam.

10. The flow straightening vane according to claim 1, wherein said textile rods each comprises two rectangular sections being pivoted 90 degrees relative to each other.

11. The flow straightening vane according to claim 10, wherein said textile rods each comprises a square intermediate area distributing chain fibers to allow pivoting from one of said two rectangular sections to the other rectangular section.

12. A flow straightening structure according to claim 1, wherein the termination ends are connected to first and second wheels of a flow straightening set.

13. The flow straightening structure according to claim 12, wherein a diameter of said first wheel is smaller than a diameter of said second wheel.

* * * * *